Jan. 27, 1970     H. D. BOULTINGHOUSE     3,491,928
FIBRILLATION OF ORIENTED FILM
Filed Oct. 3, 1966
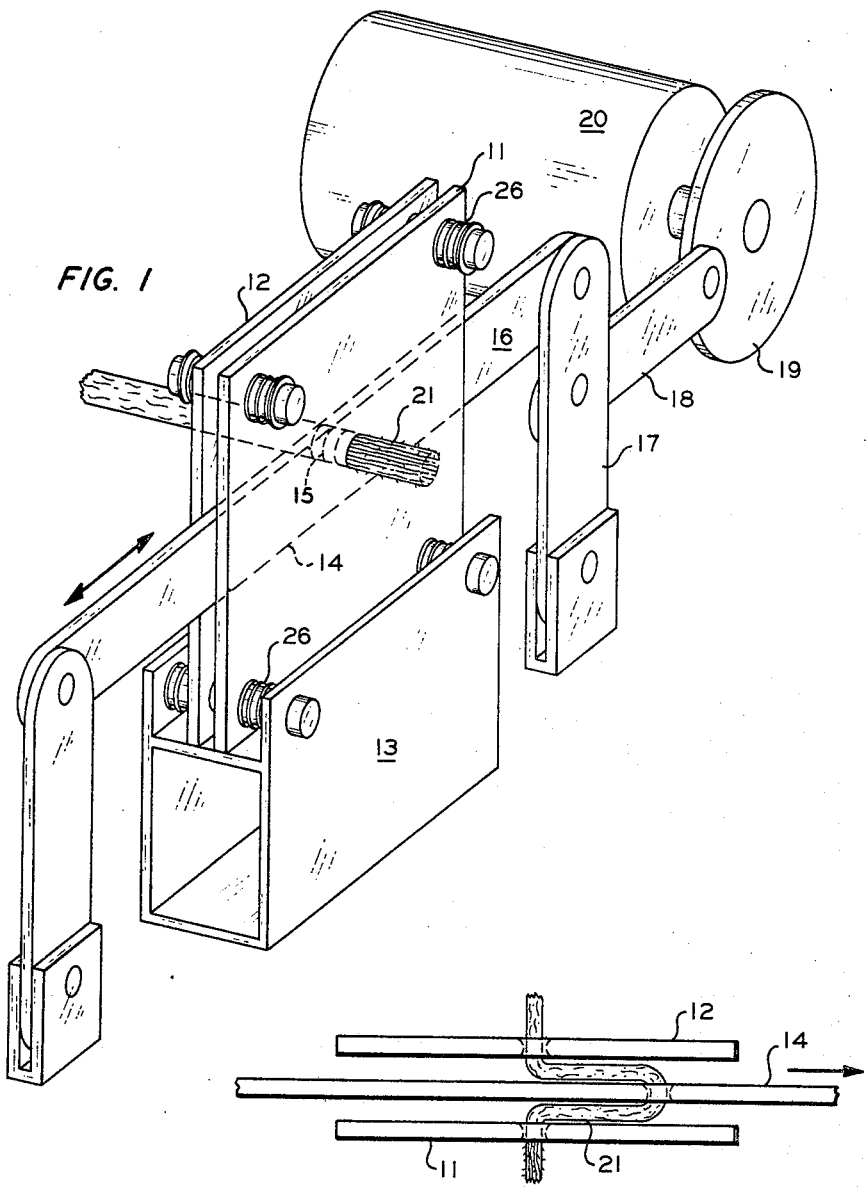
INVENTOR.
H. D. BOULTINGHOUSE
BY
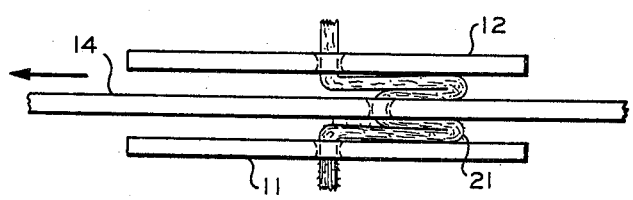

United States Patent Office 3,491,928
Patented Jan. 27, 1970

3,491,928
FIBRILLATION OF ORIENTED FILM
Harold D. Boultinghouse, Bartlesville, Okla., assignor to Phillips Petroleum Company, a corporation of Delaware
Filed Oct. 3, 1966, Ser. No. 583,913
Int. Cl. B26f 3/00; B29h 1/00
U.S. Cl. 225—3
10 Claims

ABSTRACT OF THE DISCLOSURE

Oriented film is fibrillated by passing it through aligned holes in spaced-apart parallel plates and wherein at least one of the plates is reciprocated at a frequency and amplitude sufficient to cause fibrillation of the advancing film.

---

This invention relates to the formation of fibers from highly unidirectionally oriented thermoplastic film. In one aspect, it relates to a process for fibrillating unidirectionally oriented thermoplastic film by vibrating that film in a direction transverse to the direction of orientation. In another aspect, it relates to a process for fibrillating unidirectionally oriented film by reciprocating the film rapidly in a direction transverse to the direction of orientation. In another aspect, it relates to a process for fibrillating oriented film by oscillating the film rapidly about the axis of orientation. In yet another aspect, it relates to a process for fibrillation of unidirectionally oriented thermoplastic film by concurrently vibrating that film in a direction transverse to the direction of orientation and subjecting the film to a rubbing action during said vibration. In yet another aspect, it relates to the apparatus for carrying out the abovementioned processes.

It has been known that certain orientable thermoplastic films can be formed into fibers by first orienting the film very strongly in a single direction, and then subjecting the film to various physical treatments. It has been suggested that the film can be fibrillated by subjecting it to grating, turning, twisting or brushing, as well as beating upon the film with wedge or knife-shaped hammers. Depending upon the degree of orientation and the vigor of the physical disintegration processing, the film will be completely disintegrated to form fibers or only partially disintegrated to form a nonwoven fabric having many interconnected fibers.

The processes for fibrillation which have previously been suggested do not, however, provide an efficient and effective means for forming fibers from oriented film. In general, these processes tend to twist, tangle or break the filaments, thus yielding a relatively low quality sliver from the process. Furthermore, the use of various types of rotary mechanisms in the fibrillation step gives rise to the possibility of the fibers winding upon the rotary mechanism.

It is therefore an object of my invention to provide an economical, efficient means for fibrillating unidirectionally oriented thermoplastic film. It is a further object of my invention to fibrillate oriented film without twisting, tangling or breaking of the filaments formed. It is a further object of my invention to provide an apparatus for fibrillating thermoplastic film which is inexpensive, easy to build, economical in operation, and having a high throughput rate.

These and other objects are accomplished by the process of my invention, which is to vibrate a unidirectionally oriented thermoplastic film rapidly in a direction transverse to the direction of orientation. Preferably, this vibration is accompanied by a rubbing action. My invention also encompasses the apparatus for carrying out my process, which comprises at least two parallel plates having holes therethrough, and means for vibrating at least one of the plates rapidly relative to another of the plates.

A preferred embodiment of the apparatus of my invention is shown in FIGURE I. FIGURE II shows a top view of the apparatus of my invention at one phase of its operation. FIGURE III shows a top view of the apparatus of my invention during another phase of its operation.

Referring now to FIGURE I, I provide two parallel plates 11 and 12 mounted on base 13. Mounted between the two plates is movable plate 14. Holes, in alignment, are drilled through each plate 11, 12 and 14 which provides a hole 15 through the three plates. Movable plate 14 is connected through arms 16, 17 and 18 to wheel 19 which is rotated by motor 20. As will be appreciated by one skilled in the art, operation of motor 20 will cause reciprocation of movable plate 14 at a speed equal to the rotation of the electric motor.

Unidirectionally oriented thermoplastic film 21 is doubled as necessary and fed through hole 15. As the film is being drawn through the hole by means of a takeup mechanism not shown, motor 20 is started to vibrate movable plate 14. In a preferred embodiment, the amplitude of vibration of plate 14 is sufficient to move the hole 15 in movable plate 14 completely out of alignment with the corresponding hole in the plates 11 and 12. Ordinarily, the amplitude of the vibration will be approximately twice that of the diameter of hole 15.

The action of the moving plates on the film can be seen in FIGURES II and III. In FIGURE II, as movable plate 14 approaches the extreme of its stroke, a considerable amount of film 21 has been pulled between plates 11 and 12. As movable plate 14 starts its return stroke, as shown in FIGURE III, the film lying between plates 11 and 12 and movable plate 14 is subjected to a compressive action. If the plates are held sufficiently close together, there will also be a certain amount of rubbing action on the film. The resultant stresses set up in the film due to the vibration, compression, and rubbing action will result in almost complete fibrillation of the thermoplastic film.

It will be understood that my invention is not limited to reciprocatory action of the film, but encompasses oscillatory action as well. The apparatus of my invention can easily be modified for oscillation by removing arms 17 and 18, and fastening arm 16 directly onto wheel 19.

The amplitude and speed of the vibration of the film are interdependent. If the stroke is too long, or if the strokes are too rapid, the film will melt. If the strokes are either too short or too slow there will be insufficient fibrillation. I have found that operation with a 1,750 r.p.m. motor providing a one-half inch stroke appears to be satisfactory for fibrillation.

The apparatus of my invention can be modified by providing a plurality of aligned holes through plates 11, 12 and 14 so that a number of films can be fibrillated concurrently on a single apparatus. In such case, each film would normally be wound onto a separate spool. It is also possible to pass the fibrillated material formed by the process of my invention directly to a loom or to a knitting, tufting, needling or other known textile process. It additionally is possible to twist or crimp the fibrillated material formed by the process of my invention between the fibrillation step and the subsequent processing.

It is also within the scope of my invention to provide a number of fibrillators in series. In such a case, a plurality of fibrillators such as the one shown in FIGURE I may be lined up and the film passed through each fibrillator in series. Another method of operation is to reciprocate plate 12 as well as plate 14. The reciprocating plates may be operated at different rates of reciprocation. The first fibrillator or reciprocating plate may be run at a relatively slow speed to provide rough fibrillation of the film, and each succeeding fibrillator would run at a higher speed.

Particularly fine filaments can be produced by this process.

Any orientable thermoplastic can be used in the process of this invention, including nylons, acetyls, polyesters, polyethylene, polypropylene, acrylics and polycarbonates.

Although there appears to be no theoretical limit to the thickness of films used in the process of my invention, the practical thickness appears to range from about ½ to about 10 mils.

It should be noted that one of the primary advantages of my invention is that fibrillated materials produced by this process are untwisted when emerging from the machine, and art not at any time subjected to a twist or false twist operation. The fibrillated materials produced by the process of my invention are, therefore, much less subject to tangling, and can be used in textile processes where untwisted sliver is desired.

Example

A 1-mil polyolefin film was fibrillated with the apparatus shown in FIGURE I. The plates of the apparatus were made of ⅛″ steel with a ¼″ hole through each plate, the edges of the holes being rounded off. A 1,750 r.p.m. motor was used, and provided movable plate 14 with a ½″ stroke. Four films were passed through the fibrillator at one time. Each film was doubled, and had a doubled width of 4″. The films were bunched to make a strand, and this strand passed through the holes in the plates. The film was pulled through the fibrillator at a rate of about 10 to 15 feet per minute. Quality of the fibrillated material so produced was excellent.

Reasonable variation and modification are possible within the scope of the foregoing disclosure, the drawings and the appended claims to the invention, the essence of which is that a unidirectionally oriented thermoplastic film is fibrillated by vibrating the film in a direction transverse to the direction of the unidirectional orientation.

I claim:

1. Process for fibrillating unidirectionally oriented thermoplastic film comprising passing said film in the direction of orientation through aligned holes in at least two parallel spaced apart plates, and vibrating said film in a direction transverse to the direction of said unidirectional orientation and travel of said film by vibrating at least one of said plates relative to another of said plates and wherein the amplitude and frequency of vibration of the plates are sufficient to cause fibrillation of the film being advanced through the holes in said plates.

2. Process of claim 1 wherein the amplitude of said vibration is greater than the diameter of said holes and further wherein said plates are relatively closely spaced whereby said film is subjected to a rubbing action between said plates during said vibration.

3. Process of claim 1 wherein said vibration is provided by passing said film through aligned holes in at least one group comprising three parallel plates, and vibrating the center plate relative to the outer plates in each group of three plates.

4. Process of claim 1 wherein said vibration is reciprocatory vibration.

5. Process of claim 1 wherein said vibration is oscillatory vibration.

6. Process of claim 1 wherein said plates are sufficiently close together that said film is subjected to a rubbing action between adjacent plates during said vibration and wherein the amplitude of said vibration is at least twice the diameter of said holes.

7. Apparatus for fibrillating unidirectionally oriented film comprising at least two parallel spaced apart plates having holes therethrough, means for vibrating one of said plates relative to another of said plates, and means for advancing said oriented film through the holes in said parallel plates, the amplitude and frequency of vibration of the plates being sufficient to cause fibrillation of the film being advanced through the holes in said plates.

8. Apparatus of claim 7 having at least three parallel spaced apart plates and means for vibrating the center plate for each group of three plates.

9. Apparatus of claim 7 wherein said plates are closely spaced whereby said vibrating causes said film to be subjected to a rubbing action between said plates.

10. Apparatus of claim 8 wherein the amplitude of vibration is greater than the diameter of said holes, and said plates are closely spaced whereby said film is subjected to a rubbing action between said plates during said vibration.

References Cited

UNITED STATES PATENTS

| 2,855,627 | 10/1958 | Prentiss | 83—198 X |
| 3,003,304 | 10/1961 | Rasmussen | 264—140 X |
| 3,395,525 | 8/1968 | Eddy. | |

JAMES M. MEISTER, Primary Examiner

U.S. Cl. X.R.

28—1; 225—93; 264—70, 147

Disclaimer and Dedication 3,491,928.—*Harold D. Boultinghouse*, Bartlesville, Okla. FIBRILLATION OF ORIENTED FILM. Patent dated Jan. 27, 1970. Disclaimer and dedication filed Dec. 28, 1971, by the assignee, *Phillips Petroleum Company*.

Hereby disclaims said patent and dedicates to the Public the remaining term of said patent.

[*Official Gazette April 11, 1972.*]